(12) United States Patent
Abe et al.

(10) Patent No.: US 8,410,218 B2
(45) Date of Patent: *Apr. 2, 2013

(54) PRESSURE-SENSITIVE ADHESIVE COMPOSITION HAVING IMPROVED INITIAL TACK

(75) Inventors: Hidetoshi Abe, Tendo (JP); Masaaki Furusawa, Sagae (JP); Yorinobu Takamatsu, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/670,033

(22) PCT Filed: Jul. 29, 2008

(86) PCT No.: PCT/US2008/071415
§ 371 (c)(1),
(2), (4) Date: Jun. 29, 2010

(87) PCT Pub. No.: WO2009/018246
PCT Pub. Date: Feb. 5, 2009

(65) Prior Publication Data
US 2010/0272942 A1  Oct. 28, 2010

(30) Foreign Application Priority Data
Jul. 31, 2007  (JP) ................. 2007-199630

(51) Int. Cl.
*C08L 33/00* (2006.01)
*C08L 33/02* (2006.01)
*C08L 33/24* (2006.01)
*C08L 35/00* (2006.01)
*C08L 39/00* (2006.01)
*C09J 4/00* (2006.01)

(52) U.S. Cl. ........ 525/217; 525/218; 525/221; 525/222; 156/331.6; 156/285

(58) Field of Classification Search .................. 525/217, 525/218, 221, 222; 156/331.6, 285
See application file for complete search history.

(56) References Cited

U.S. PATENT DOCUMENTS

| 6,448,339 | B1 | 9/2002 | Tomita | |
|---|---|---|---|---|
| 7,691,948 | B2 * | 4/2010 | Takamatsu et al. | 525/217 |
| 2010/0323195 | A1 * | 12/2010 | Furusawa et al. | 428/343 |

FOREIGN PATENT DOCUMENTS

| JP | 5488938 | 7/1979 |
|---|---|---|
| JP | 3516035 | 11/1998 |
| JP | 10310754 | 11/1998 |
| JP | 2001089731 | 4/2001 |
| JP | 2002327160 | 11/2002 |
| JP | 2006522856 | 10/2006 |
| JP | 2007009006 | 1/2007 |
| KR | 1020060072140 | 6/2006 |
| WO | 9851754 | 11/1998 |
| WO | 2004094549 | 11/2004 |

OTHER PUBLICATIONS

Search Report for PCTUS2008-071415, 3 pages.
Written Opinion of PCTUS2008-071415, 4 pages.

* cited by examiner

*Primary Examiner* — Nathan M Nutter
(74) *Attorney, Agent, or Firm* — Sandra K. Nowak

(57) ABSTRACT

The present invention is directed to providing a pressure-sensitive adhesive with good initial tack and good adhesion at low temperature. Generally, the pressure-sensitive adhesive composition comprises (1) a carboxylic group-containing (meth)acrylic tacky polymer having a weight average molecular weight of less than 800,000 and a glass transition temperature of −100° C. to −30° C., and (2) an amino group-containing (meth)acrylic non-tacky polymer having a weight average molecular weight of from 30,000 to 100,000 and a glass transition temperature of 20° C. to 90° C. The amino group-containing (meth)acrylic non-tacky polymer (2) is present in an amount of no less than 1 parts by mass and less than 20 parts by mass on a basis of 100 parts by mass of said carboxylic group-containing (meth)acrylic tacky polymer (1).

5 Claims, No Drawings

PRESSURE-SENSITIVE ADHESIVE COMPOSITION HAVING IMPROVED INITIAL TACK

FIELD

The present invention relates to a pressure-sensitive adhesive composition having improved initial tack or a pressure-sensitive adhesive film having improved initial tack.

BACKGROUND

Decorative marking films are widely used outdoors or indoors as substitution material for painting. Materials having excellent adhesion property over various temperature ranges from winter to summer are desired. Generally, acrylic polymers having good outdoor durability are used.

In some references, the adhesive composition comprises a resin composition is disclosed. A first resin composition was obtained by copolymerizing monomers consisting essentially of alkyl (meth)acrylate, and further containing 0.5-10 wt. % unsaturated monomer having a carboxyl group and copolymerizable with the 1-12C alkyl (meth)acrylate, and having $\geqq 800,000$ weight average molecular weight. This was then mixed with a second resin composition obtained by copolymerizing monomers consisting essentially of one or more kinds of monomers selected from a 1-20 C alkyl methacrylate, a cycloalkyl methacrylate, benzyl methacrylate or styrene, and further containing 0.5-10 wt. % copolymerizable unsaturated monomer having an amino group, and having $\leqq 40°$ C. glass transition temperature and $\leqq 100,000$ weight average molecular weight. About 1-40% by weight of the second resin composition was added to 100 parts weight of the first resin composition. See, for example, JP 3516035B.

An adhesive composition for a hot melt adhesive comprising a mixture of a copolymer consisting of carboxylic group-containing acrylic acid ester and a copolymer consisting of amines was disclosed in, for example, JP 54-88938 A.

Further an adhesive composition suitable for optical products comprising a blend of a pressure sensitive adhesive, a polymer having a weight average molecular weight of over 100,000 and a high Tg, and a crosslinker was disclosed in, for example, JP 2006-522856 T.

An adhesive composition comprising a tacky polymer, a low molecular weight polymer and a crosslinker was also disclosed. The tacky polymer had a weight average molecular weight of more than 600,000 consisting essentially of alkoxyalkyl(meth)acrylate with a carboxyl group-containing monomer, and the low molecular weight polymer had a glass transition temperature (Tg) of more than 60 degrees C. and a weight average molecular weight of less than 50,000. See, for example, JP 2002-327160 A.

Generally, an adhesive composition having good adhesion at low temperatures in winter is difficult to adhere initially due to a high initial tack at ambient or higher temperature. A monomer having a high glass transition temperature (Tg) can be used to reduce the initial tack. In this case, another issue such as an adhesion property in low temperature comes up. A non-adhesive component such as inorganic materials or plasticizers can be dispersed to the tacky polymer, but it is still problem that an adhesion property at low temperature decreases or an adhesion property is impaired by migrating of additives to the surface.

DETAILED DESCRIPTION

The present invention is directed to providing a pressure-sensitive adhesive with good initial tack and good adhesion at low temperature. The pressure sensitive adhesive is obtained by adding a base-containing non-tacky polymer having compatibility with tacky polymer component and a crosslinker to a carboxylic group-containing adhesive polymer having a good adhesion property at low temperature.

Generally, the pressure-sensitive adhesive composition comprises (1) a carboxylic group-containing (meth)acrylic tacky polymer having a weight average molecular weight of less than 800,000 and a glass transition temperature of $-100°$ C. to $-30°$ C., and (2) an amino group-containing (meth)acrylic non-tacky polymer having a weight average molecular weight of from 30,000 to 100,000 and a glass transition temperature of 20° C. to 90° C., wherein said amino group-containing (meth)acrylic non-tacky polymer (2) is present in an amount of no less than 1 parts by mass and less than 20 parts by mass on a basis of 100 parts by mass of said carboxylic group-containing (meth)acrylic tacky polymer (1).

Further the present invention provides a marking film comprising a base film layer and a pressure-sensitive adhesive layer comprising the pressure-sensitive adhesive composition of the present invention, wherein said pressure-sensitive adhesive layer has a non-flat surface structure.

The pressure-sensitive adhesive composition of the present invention comprises (1) a carboxylic group-containing (meth) acrylic tacky polymer having a weight average molecular weight of less than 800,000 and a glass transition temperature of $-100°$ C. to $-30°$ C., and (2) an amino group-containing (meth)acrylic non-tacky polymer having a weight average molecular weight of from 30,000 to 100,000 and a glass transition temperature of 20° C. to 90° C. The pressure-sensitive adhesive composition of the present invention comprises no less than 1 parts by mass to no less than 20 parts by mass of the polymer(2) with respect to 100 parts by mass of the polymer(1).

By the composition above, the non-tacky component can be compatibly dispersed in the tacky polymer and localized in the tacky polymer in tiny size, the initial wettability is reduced, and the tack is increased since the tacky polymer gets wet gradually, then the tack may increases. Therefore, the adhesive which has a good adhesive property through a whole year can be provided.

The term "(meth)acrylic" means acrylic or methacrylic in the present specification.

The carboxylic group-containing (meth) acrylic tacky polymer of the present invention includes a polymer including a monoethylenic unsaturated monomer as a major ingredient and a carboxylic group-containing monoethylenic unsaturated monomer as part of thereof. The monoethylenic unsaturated monomer is a main component of a polymer. It is typically represented with the formula $CH_2=CR^1COOR^2$, wherein $R^1$ represents a hydrogen atom or a methyl group and $R^2$ represents a linear, cyclic or branched alkyl group, a phenyl group, an alkoxyalkyl group or a phenoxyalkyl group, a hydroxyalkyl group or a cyclic ether group. Examples of such monomers include alkyl (meth)acrylates such as methyl (meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth) acrylate, decyl (meth)acrylate, dodecyl (meth)acrylate, cyclohexyl (meth)acrylate; phenoxyalkyl (meth)acrylates such as phenoxyethyl (meth)acrylate; alkoxyalkyl (meth) acrylates such as methoxypropyl (meth)acrylate and 2-methoxybutyl (meth)acrylate; hydroxyalkyl(meth)acrylate such as 2-hydroxyethyl (meth)acrylate, 2-hydroxypropyl (meth) acrylate and 4-hydroxybutyl (meth)acrylate, and cyclic ether containing (meth)acrylate such as glycidyl (meth)acrylate, tetrahydrofurfuryl (meth)acrylate. One or more monoethylenic unsaturated monomer can be used, if necessary.

The carboxylic group-containing monoethylenic unsaturated includes unsaturated carboxylic acids such as acrylic acid, methacrylic acid or crotonic acid; unsaturated dicarboxylic acids such as itaconic acid, fumaric acid, citraconic acid or maleic acid; ω-carboxy polycaprolactone monoacrylate, β-carboxyethyl acrylate or 2-(meth)acryloyloxy ethyl succinate.

The carboxylic group-containing (meth) acrylic tacky polymer can be prepared by, for example, co-polymerization of 80 to 95.5 parts by mass of the monoethylenic unsaturated monomer and 0.5 to 20 parts by mass of the carboxylic group-containing monoethylenic unsaturated monomer. Alternatively, 90 to 99 parts by mass of the monoethylenic unsaturated monomer and 1 to 10 parts by mass of the carboxylic group-containing monoethylenic unsaturated monomer can be useful for the above co-polymerization.

The weight average molecular weight of the carboxylic group-containing (meth) acrylic tacky polymer can be less than 800,000. For example, it can be 100,000 to 800,000 or 300,000 to 750,000.

The glass transition temperature of the carboxylic group-containing (meth) acrylic tacky polymer can be from −100 degrees C. to −10 degrees C., −80 degrees C. to −20 degrees C. or −60 degrees C. to −30 degrees C.

The amino group containing-(meth) acrylic non-tacky polymer is a polymer containing monoethylenic unsaturated monomers as a main component and an amino group-containing monoethylenic unsaturated monomer as part of thereof. The monoethylenic unsaturated monomer is the same as that of the carboxylic group-containing (meth) acrylic tacky polymer above.

The amino group containing-monoethylenic unsaturated monomer includes dialkylamino alkyl (meth)acrylates such as N,N-dimethylamino ethyl acrylate (DMAEA) or N,N-dimethylamino ethyl methacrylate (DMAEMA); dialkylamino alkyl (meth)acrylamides such as N,N-dimethylamino propyl acrylamide (DMAPAA) or N,N-dimethylamino propyl methacrylamide; or dialkylamino alkyl vinyl ethers such as N,N-dimethylamino ethyl vinyl ether or N,N-diethylamino ethyl vinyl ether; or a mixture thereof.

The amino group-containing non-tacky polymer can be prepared by, for example, co-polymerization of about 80 to about 99.5 parts by mass of the monoethylenic unsaturated monomer and about 0.5 to about 20 parts by mass of the amino group-containing monoethylenic unsaturated monomer. Alternatively, about 90 to about 99 parts by mass of the monoethylenic unsaturated monomer and about 1 to about 10 parts by mass of the amino group-containing monoethylenic unsaturated monomer can be used for the above co-polymerization.

The weight average molecular weight of the amino group-containing non-tacky polymer can be 30,000 to 100,000, preferably 30,000 to 80,000.

The glass transition temperature of the amino group-containing non-tacky polymer can be from 20 degrees C. to 95 degrees C., preferably 30 degrees C. to 90 degrees C.

The weight average molecular weight (Mw) of the amino group-containing non-tacky polymer can be measured by GPC method (Gel Permeation Chromatography). Under the following conditions:
Experimental apparatus: HP-1090 Series II (available from Hewlett-Packard)
Solvent: tetrahydrofuran
Column: Plgel MIXED-Bx2 (300 mm, OD 7.5 mm, ID5 mm)
Flow rate: 1.0 mL/min
Detection: refractive index
Sample concentration: 0.1 wt %
Calibration standard: polystyrene The glass transition temperature (Tg) of the carboxyl group-containing (meth)acrylic tacky polymer and the amino group-containing (meth)acrylic non-tacky polymer was determined by the FOX's equation (the following equation) on the assumption that the respective polymers are copolymerized from n kinds of monomers.

$$1/Tg = X1/(Tg1+273.15) + X2/(Tg2+273.15) + \ldots + Xn/(Tgn+273.15)$$

Tg1: a glass transition point of a homopolymer as a component 1
Tg2: a glass transition point of a homopolymer as a component 2
X1: a weight fraction of a monomer as a component 1 added during the polymerization
X2: a weight fraction of a monomer as a component 2 added during the polymerization $$X1 + X2 + \ldots + Xn = 1$$

The pressure-sensitive adhesive of the present invention includes no less than 1 parts by mass and less than 20 parts by mass of the amino group-containing (meth)acrylic non-tacky polymer (2) with respect to 100 parts by mass of the carboxylic group-containing (meth)acrylic tacky polymer (1). Preferably, the amount of the amino group-containing (meth) acrylic non-tacky polymer (2) can be 1 parts by mass to 15 parts by mass or 1 parts by mass to 10 parts by mass.

The pressure-sensitive adhesive of the present invention may further include a crosslinker. The crosslinker includes, for example, bisamide cross-linking agents (for example, 1,1'-isophtharoyl-bis(2-methyladiridine), azirizine cross-linking agents (for example, Chemitite PZ33 available from Nihon Shokubai, NeoCryl CX-100 made by Avecia), carbodiimide cross-linking agents (for example, Carbodilite V-03, V-05, V-07 available from Nisshinbo), isocyanate cross-linking agents (for example, Colonate L and Colonate HK available from Nihon Urethane, Desmodul H, Desmodul W and Desmodul I available from Bayer), or epoxy cross-linking agents (for example, E-AX, E-5XM, E5C available from Soken Chemical & Engineering).

The amount of the crosslinker can be from 0.01 to 0.5 equivalent to carboxyl group of the carboxyl group-containing polymer or amino groups of the amino group-containing polymer.

The co-polymerization of the polymers can be carried out by radical polymerization. In this case, known polymerization methods such as solution polymerization, suspension polymerization, emulsion polymerization or bulk polymerization can be used. Examples of initiators used include organic peroxides such as benzoyl peroxide, lauroyl peroxide and bis(4-tertiary-butyl cyclohexyl) peroxydicarbonate, and azo-based polymerization initiators such as 2,2'-azobisisobutyronitrile, 2,2'-azobis-2-methylbutyronitrile, 4,4'-azobis-4-cyanovaleric acid, 2,2'-azobis(2-methylpropionic acid) dimethyl and azobis-2,4-dimethylvaleronitrile (AVN). The amount of these initiator used can be 0.05 to 5 parts by mass per 100 parts by mass of monomer mixture.

The pressure-sensitive adhesive of the present invention may be prepared by mixing the carboxylic group-containing (meth)acrylic tacky polymer with the amino group-containing (meth)acrylic non-tacky polymer with known methods. The crosslinker can be added, if necessary.

The marking film of the present invention comprises a base film layer and a pressure-sensitive adhesive layer comprising the pressure-sensitive adhesive composition of the present invention. Further the pressure-sensitive adhesive layer includes a textured surface.

The base film layer includes, but is not limited to, for example, polyethylene film, polypropylene film, polyester film, polycarbonate film, polyvinyl chloride film, polyvinylidene chloride film, polystyrene film or polyamide film.

The marking film of the present invention may further comprise a liner that is disposed on the opposite of the adhesive layer from the base film layer. The liner is not limited to specific members and includes a liner usually used in adhesive tape area. The liner includes, for example, papers; plastics such as polyethylene, polypropylene, polyester or cellulose acetate; or papers coated by such plastics, or laminated with these plastics. These liners can be used without pretreatment, or with pretreatment by silicone or the like to improve peeling property.

The texture size of the surface of the adhesive layer represents an average surface roughness (Ra), and the average surface roughness can be no less than 0.1 micrometer, preferably no less than 0.5 micrometer, more preferably no less than 1.0 micrometer. The texture shape is not limited to, but can be random concavo-convex or regular concavo-convex. Preferably, the texture shape includes a convex part and a concavo part continuously surrounding the convex part. The regular concavo-convex shape includes, for example, a shape formed by a convex part having polygonal shape such as tetragonal, round shape, or analogous shapes of horizontal cross sectional surface (the cross sectional surface parallel to the adhesive surface), and a concavo part formed by continuously surrounding the above convex part. The vertical cross sectional (the vertical cross sectional surface to the adhesive surface) shape of concavo can be tetragon such as trapezoid or rectangle, half round or analogous shapes.

The method of making the convex-concavo on the surface of the adhesive layer includes, for example, transferring a convex-concavo (negative) pattern on the film surface by pressing the crimping tool having the convex-concavo (positive) pattern to the flat film surface. The crimping tool can be heated to use. The positive pattern has the same shape and size of the convex-concavo pattern should be made on the adhesive surface.

Alternatively, the method of making the convex-concavo pattern on the surface of the adhesive layer includes laminating a release liner having the convex-concavo patterned surface to the adhesive layer. The release liner includes a paper or a plastic film, or a laminate of the paper and the plastic film.

The known release liners can be used, and it can also be used that the release liner having convex-concavo textured surface corresponding to negative obtained by pouring material fluid including plastic into a mold having positive pattern, solidifying on the mold, and then removing the mold.

The convex-concavo textured surface of the release liner can be made a treatment such as a silicon treatment. The treatment can be omitted when the plastic includes olefins.

The marking film of the present invention may further comprise some functional layers such as a primer layer.

The thickness of each layer of the colored marking film is not limited. Preferably, the thickness of the base film layer can be about 5 micrometer to about 300 micrometer; that of the adhesive layer can be about 5 micrometer to about 100 micrometer; and that of the liner can be about 10 micrometer to about 500 micrometer, or about 25 micrometer to about 200 micrometer.

The marking film of the present invention can be prepared by known methods. For example, the solution of the acrylic adhesive in organic solvent is coated on the liner by knife coating or bar coating, then drying to form the pressure-sensitive adhesive layer. The obtained adhesive layer is laminated on the base film layer by dry laminating to form the making film.

EXAMPLES

The carboxylic group-containing (meth)acrylic tacky polymer (tacky polymers 1 to 4) and the amino group-containing (meth)acrylic non-tacky polymer (non-tacky polymers 1 to 3) were prepared by co-polymerization of ratio and monomer composition of monomers listed in Table 1 respectively in solvents listed in Table 1.

The weight average molecular weight (Mw) of each polymer listed in Table 1 was measured by GPC method with the following condition.

Experimental apparatus: HP-1090 Series II (available from Hewlett-Packard)
Solvent: tetrahydrofuran
Column: Plgel MIXED-Bx2 (300 mm, OD 7.5 mm, ID 5 mm)
Flow rate: 1.0 mL/min
Detection: refractive index
Sample concentration: 0.1 wt %
Calibration standard: polystyrene

TABLE 1

|  | Composition | Mw | Tg (□) | Solids (%) | Solvent |
|---|---|---|---|---|---|
| Tacky polymer1 | BA-2EHA-AN-AA = 58:36:1:5 | 500,000 | −53 | 33 | EtAc |
| Tacky polymer2 | BA-AA = 96:4 | 580,000 | −50 | 42 | EtAc/Toluene |
| Tacky polymer3 | BA-AA = 94:6 | 230,000 | −48 | 50 | EtAc |
| Tacky polymer4 | 2MBA-AA = 90:10 | 400,000 | −23 | 40 | EtAc |
| Non-tacky polymer1 | MMA-BMA-DMAEMA = 60:34:6 | 70,000 | 66 | 40 | EtAc |
| Non-tacky polymer2 | MMA-DMAEMA = 94:6 | 50,000 | 98 | 50 | EtAc |
| Non-tacky polymer3 | MMA-BMA-DMAEMA = 69:25:6 | 150,000 | 74 | 50 | EtAc |
| Crosslinker1 | Bisamide, (1,1'-isophthaoyl-bis(2-methyladiridine) | ** | ** | 5 | Toluene |
| Crosslinker2 | Epoxy, (E-AX, available from Soken Chemical) | ** | ** | 5 | Toluene |

BA: butyl acrylate
2EHA: 2-ethyl hexyl acrylate
AN: acrylonitrile
AA: acrylic acid
MMA: methyl methacrylate
DEMAEMA: dimethyl amino ethylmethacrylate
BMA: butyl methacrylate
2MBA: 2-methyl butyl acrylate The adhesive solutions of Examples 1 to 5, Reference 1, and Comparative examples 1 to 7 were prepared by mixing the components listed in Table 2. The adhesive solutions were observed by visual check. If the adhesive solution was clear, it was judged as "Good". If the adhesive solution was hazy, it was judged as "Poor".

TABLE 2

|  | Tacky polymer (A) | Non-tacky polymer (B) | Crosslinker (C) | Mass Ratio A:B:C | Miscibility |
|---|---|---|---|---|---|
| Ex. 1 | Tacky polymer1 | Non-tacky polymer1 | Crosslinker1 | 100:10:0.2 | Good |
| Ex. 2 | Tacky polymer1 | Non-tacky polymer1 | Crosslinker2 | 100:10:0.1 | Good |
| Ex. 3 | Tacky polymer1 | Non-tacky polymer1 | Crosslinker1 | 100:10:0.1 | Good |
| Ex. 4 | Tacky polymer1 | Non-tacky polymer1 | Crosslinker1 | 100:7.5:0.2 | Good |
| Ex. 5 | Tacky polymer3 | Non-tacky polymer1 | Crosslinker1 | 100:10:0.2 | Good |
| Ref. 1 | Tacky polymer1 | Non-tacky polymer3 | Crosslinker1 | 100:10:0.2 | Good |
| C. Ex. 1 | Tacky polymer1 | None | Crosslinker1 | 100:0:0.2 | ** |
| C. Ex. 2 | Tacky polymer2 | None | Crosslinker1 | 100:0:0.2 | ** |
| C. Ex. 3 | Tacky polymer3 | None | Crosslinker1 | 100:0:0.2 | ** |
| C. Ex. 4 | Tacky polymer4 | None | Crosslinker1 | 100:0:0.15 | ** |
| C. Ex. 5 | The same as Ex. 1 | | | | |
| C. Ex. 6 | Tacky polymer1 | Non-tacky polymer2 | Crosslinker1 | 100:10:0.2 | Good |
| C. Ex. 7 | Tacky polymer2 | Non-tacky polymer1 | Crosslinker1 | 100:20:0.2 | Good |

The obtained adhesive solution was coated on the double sided polyethylene laminated release liner with textured silicon surface (SCW860 available from Sumitomo 3M, Comply liner) with knife coating to make the 33 micrometer thick adhesive after drying. Then, dried and crosslinked at 90 degrees C. for 5 minutes. And then the adhesive was disposed on a 50 micrometer thick white polyvinylchloride film (available from Sumitomo 3M) with dry lamination to give the marking film.

The textured silicone surface of the release liner had a pattern along with a grid pattern which includes a plural of ridges corresponding to a groove part should be made on the adhesive surface of the adhesive layer.

The ridge height was 11 micrometer, the ridge width was 20 micrometer, and the pitch of the ridge (maximum distance=distance between the lowest point of the ridges) was 0.2 mm.

The vertical cross sectional shape of concavo surrounded by the ridges was substantially trapezoidal and accordingly the vertical cross sectional shape of adhesive surface was substantially trapezoidal also.

The roughness of silicone treated surface was measured with a surface roughness tester (Handysurf E-35A available from Toyo Seimitsu). The cut-off value was 0.8 mm and the measured length was 4 mm. The average surface roughness Ra was 2.2 micrometer.

The adhesive formulation of Examples 6 and 7 were the same as Example 1.

For Example 6, RHC11T(double sided polyethylene laminated release liner with silicon surface) available from Sun A. Kaken was used. Ra was 1.1 micrometer.

For Example 7, JINT106 (double sided clay-coated release liner with silicon surface) available from Sumitomo 3M was used. Ra was 0.9 micrometer.

For Comparative example 5, the PET release liner with flat silicon surface was used. Ra was 0.06 micrometer.

The adhesion, the contact area, and the initial tack by hands-on test of the obtained adhesive films were conducted and the result was shown in Table 3. Each measuring method was mentioned below.

Adhesion

The adhesive films were cut into 150 mm length by 25 mm width to give gave test samples. The test samples were applied on melamine painted panels available from Paltec at 20 degrees C. or 5 degrees C. The application method in accordance with JIS S Z 0237 8.2.3. was used. After 5 minutes at the same temperature, 180 degree peel was measured with Tensilon RTF available from AND.

Contact Area Rate

The adhesive film without the release liner was placed on the flat surface of Micro slide glass (Shirobuchi Migaki No. 1 available from Matsunami Glass Industry co., Ra of flat surface was about 0.001 micrometer.) having the length of 76 mm, the width of 26 mm and the thickness of 1 mm, pressed three laps along the length with a 2 kg roller having about 45 mm width, then to give a test sample.

When the glass plate was illuminated with a white light from the glass surface on which the adhesive film was not adhered, the area where the adhesive was in contact with the glass surface (contact area) was observed dark and the non-contact area was observed white, through a polarized light filter. These phenomena were observed with an optical microscope (EMP-ST available from Kyowa Kogaku) and the image data was retrieved into the image processor (Excell-II available from Nihon avionics) through CCD camera (TI-32XA available from NEC). The ratio between the contact area and the total area was expressed in percentage to give "contact area rate". The total area was about 1 cm$^2$. The procedures above were carried out at 25 degrees C., then the contact area ratio was measured after 5 minutes and 24 hours.

Initial Tack by Hands-on Test

The adhesive films were cut into 150 mm length and 70 mm width specimens. The specimen was applied on the melamine painted panel available from Paltec with a squeeze at 23 degrees C. Right after that, the specimen was quickly stripped off the panel with a hand, and the peel force was evaluated sensory. When a specimen could remove easily without deformation, it was ranked as "Good". When a specimen could remove without deformation but feeling tacky, it was ranked as "Fair". When a specimen could not remove easily due to aggressive tack and the specimen was stretched, it was ranked as "Poor".

TABLE 3

|  | Adhesion1 20×5 min. (N/25 mm) | Adhesion2 5×5 min. (N/25 mm) | Contact area1 23×5 min. (%) | Contact area2 23×24 hrs. (%) | Initial tack by hands-on test |
|---|---|---|---|---|---|
| Ex. 1 | 20 | 17 | 71 | 86 | Good |
| Ex. 2 | 18 | 20 | 74 | 90 | Good |
| Ex. 3 | 20 | 17 | 75 | 98 | Good |
| Ex. 4 | 20 | 17 | 68 | 73 | Good |
| Ex. 5 | 23 | 24 | 73 | 99 | Good |
| Ref. 1 | 20 | 21 | 70 | 70 | Good |
| C. Ex. 1 | 17 | 29 | 96 | 95 | Poor |
| C. Ex. 2 | 17 | 25 | 95 | 98 | Poor |
| C. Ex. 3 | 24 | 26 | 73 | 100 | Fair |
| C. Ex. 4 | 23 | 4 | 53 | 57 | Good |
| C. Ex. 5 | 22 | 29 | 100 | 100 | Poor |
| C. Ex. 6 | 14 | 18 | 77 | 66 | Good |
| C. Ex. 7 | 15 | 7 | 58 | 88 | Good |

The invention claimed is:

1. A pressure-sensitive adhesive composition comprising (1) a carboxylic group-containing (meth)acrylic tacky polymer having a weight average molecular weight of less than 800,000 and a glass transition temperature of −100° C. to −30° C., and (2) an amino group-containing (meth)acrylic non-tacky polymer having a weight average molecular weight of from 30,000 to 100,000 and a glass transition temperature of 20° C. to 90° C., wherein said amino group-containing (meth)acrylic non-tacky polymer is present in an amount of no less than 1 parts by mass and less than 20 parts by mass on a basis of 100 parts by mass of said carboxylic group-containing (meth)acrylic tacky polymer.

2. The pressure-sensitive adhesive composition according to claim 1, wherein said carboxylic group-containing (meth)acrylic tacky polymer has a weight average molecular weight of 100,000 to 800,000.

3. The pressure-sensitive adhesive composition according to claim 1 or 2, wherein said carboxylic group-containing (meth)acrylic tacky polymer has a glass transition temperature of −80° C. to −30° C.

4. The pressure-sensitive adhesive composition according to any one of claim 1 or 2, wherein said polymer is present in an amount of no less than 1 parts by mass and less than 10 parts by mass on a basis of 100 parts by mass of said polymer.

5. The pressure-sensitive adhesive composition according to any one of claim 1 or 2, wherein it further comprises a cross-linking agent.

* * * * *